United States Patent
Amamiya et al.

(10) Patent No.: US 7,018,158 B2
(45) Date of Patent: Mar. 28, 2006

(54) OPERATING MEMBER AND ARMREST FOR INDUSTRIAL VEHICLE

(75) Inventors: Yoshiyuki Amamiya, Kariya (JP); Kazushi Kamiya, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 124 days.

(21) Appl. No.: 10/401,905

(22) Filed: Mar. 28, 2003

(65) Prior Publication Data

US 2005/0072619 A1 Apr. 7, 2005

(30) Foreign Application Priority Data

Apr. 3, 2002 (JP) ............................. 2002-101692

(51) Int. Cl.
*B66F 9/24* (2006.01)

(52) U.S. Cl. ........................ 414/636; 180/315; 187/223

(58) Field of Classification Search ........ 187/222–224; 180/315; 414/636
See application file for complete search history.

(56) References Cited

U.S. PATENT DOCUMENTS

| | | | | |
|---|---|---|---|---|
| 4,200,166 A | * | 4/1980 | Hansen | 180/315 |
| 4,478,308 A | * | 10/1984 | Klaassen | 180/326 |
| 4,646,869 A | * | 3/1987 | Kerner, Jr. | 180/334 |
| 4,702,520 A | * | 10/1987 | Whisler et al. | 297/411.36 |
| 4,895,040 A | * | 1/1990 | Soederberg | 74/491 |
| 5,134,259 A | * | 7/1992 | Page, Jr. | 200/341 |
| 5,184,699 A | * | 2/1993 | Aoki et al. | 187/224 |
| 5,244,066 A | * | 9/1993 | Mackoway et al. | 192/13 R |
| 5,520,258 A | * | 5/1996 | Kemshall | 180/68.5 |
| 5,566,778 A | * | 10/1996 | Valier et al. | 180/334 |
| 5,671,546 A | * | 9/1997 | Haala | 34/92 |
| 5,960,903 A | * | 10/1999 | Abels et al. | 180/315 |
| 6,092,976 A | * | 7/2000 | Kamiya | 414/636 |
| 6,164,415 A | * | 12/2000 | Takeuchi et al. | 187/224 |
| 6,189,964 B1 | * | 2/2001 | Henshaw et al. | 297/112 |
| 6,450,284 B1 | * | 9/2002 | Sakyo et al. | 180/329 |
| 6,667,451 B1 | * | 12/2003 | Hart | 200/314 |

FOREIGN PATENT DOCUMENTS

| | | | |
|---|---|---|---|
| JP | 11-15520 | * | 11/1998 |
| JP | 10-330095 | | 12/1998 |

\* cited by examiner

*Primary Examiner*—Thomas J. Brahan
(74) *Attorney, Agent, or Firm*—Morgan & Finnegan, LLP

(57) ABSTRACT

An industrial vehicle has an armrest. The armrest extends in a front-and-rear direction of the vehicle. A plurality of operating members for controlling a loading operation of the vehicle is arranged on a front side of the armrest. The operating members include a first operating member for controlling an actuator for loading and a second operating member for controlling the actuator. The first operating member and the second operating member are separately arranged.

14 Claims, 5 Drawing Sheets

OPERATING MEMBER AND ARMREST FOR INDUSTRIAL VEHICLE

The present invention generally relates to industrial vehicles including forklift trucks, and more particularly to industrial vehicles in which a plurality of operating members for controlling the loading operation of the industrial vehicle is arranged on an armrest.

An armrest is arranged at the side of a seat, normally at the right side of the seat in a forklift truck. Recently, an operating apparatus, in which a plurality of control levers is arranged on the armrest in a lateral direction, has been provided to reduce fatigue of an operator and to offer comfortable working environment, in the forklift truck. Meanwhile, in the operating apparatus of the forklift truck, a push-button switch for stopping the tilt of a mast when a fork becomes horizontal has been provided on the front surface of a knob of a control lever for controlling the frontward and backward tilt of the mast. Such a technique is disclosed, for example, in Japanese Unexamined Patent Publication No. 10-330095.

However, in the operating apparatus, in which the push-button switch is attached to the knob of the control lever, the push-button switch may be wrongly operated when the knob is held by a hand and the control lever is tilted frontward and backward. More specifically, in a case of the push-button switch for automatically stopping the tilt of the mast when the fork becomes horizontal, the control lever is tilted frontward when the mast is tilted frontward. However, the direction in which the switch on the front of the knob is pushed is opposite to the frontward direction in which the control lever is tilted. Therefore, the wrong operation may easily occur.

SUMMARY OF THE INVENTION

The present invention addresses the above-mentioned problems associated with the avoidance of the wrong operation for a plurality of operating members related to each other for controlling a common actuator for loading, in an industrial vehicle in which the plurality of operating members are arranged on an armrest.

In accordance with the present invention, an industrial vehicle has an armrest extends in a front-and-rear direction of the vehicle. A plurality of operating members for controlling the loading operation of the industrial vehicle is arranged on a front side of the armrest. The operating members include a first operating member for controlling an actuator for loading and a second operating member for controlling the actuator. The first operating member and the second operating member are separately arranged.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
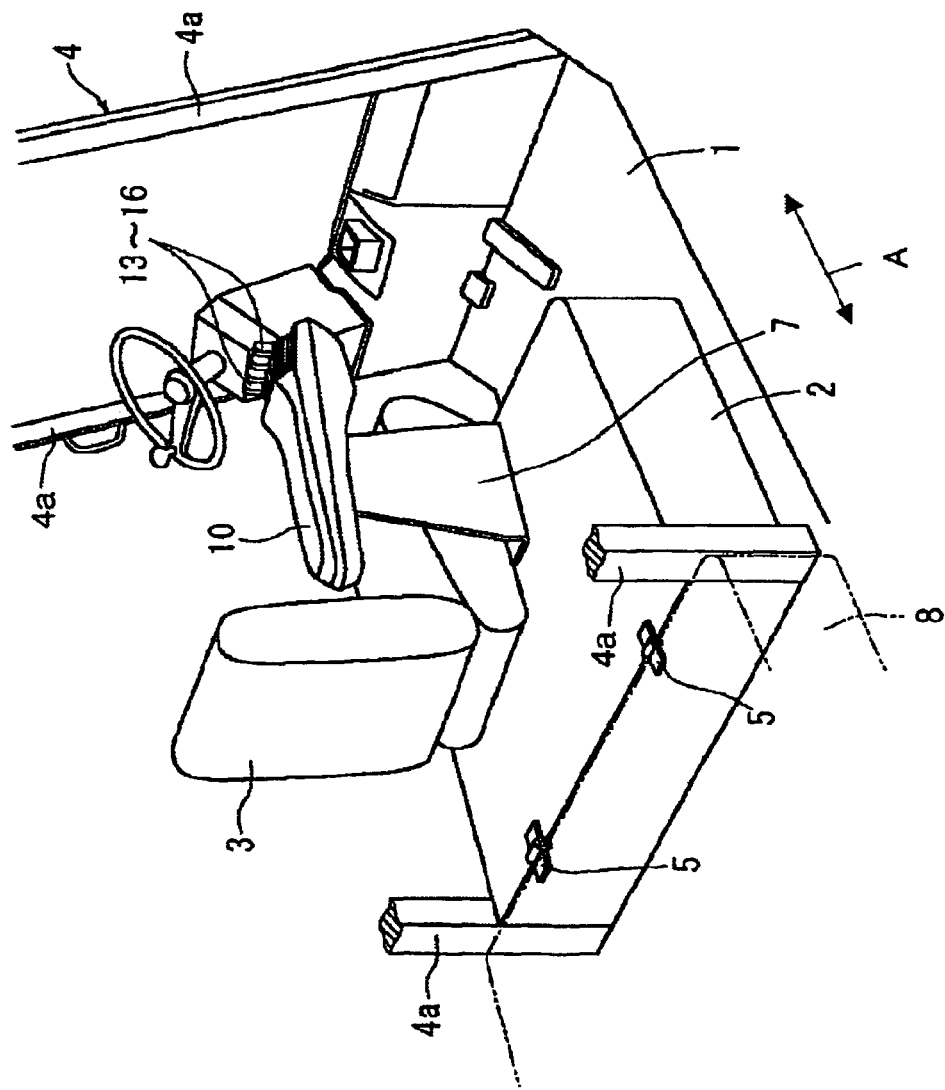
FIG. 1 is a perspective view around a seat of a forklift truck according to a presently preferred embodiment.
Figure 2:
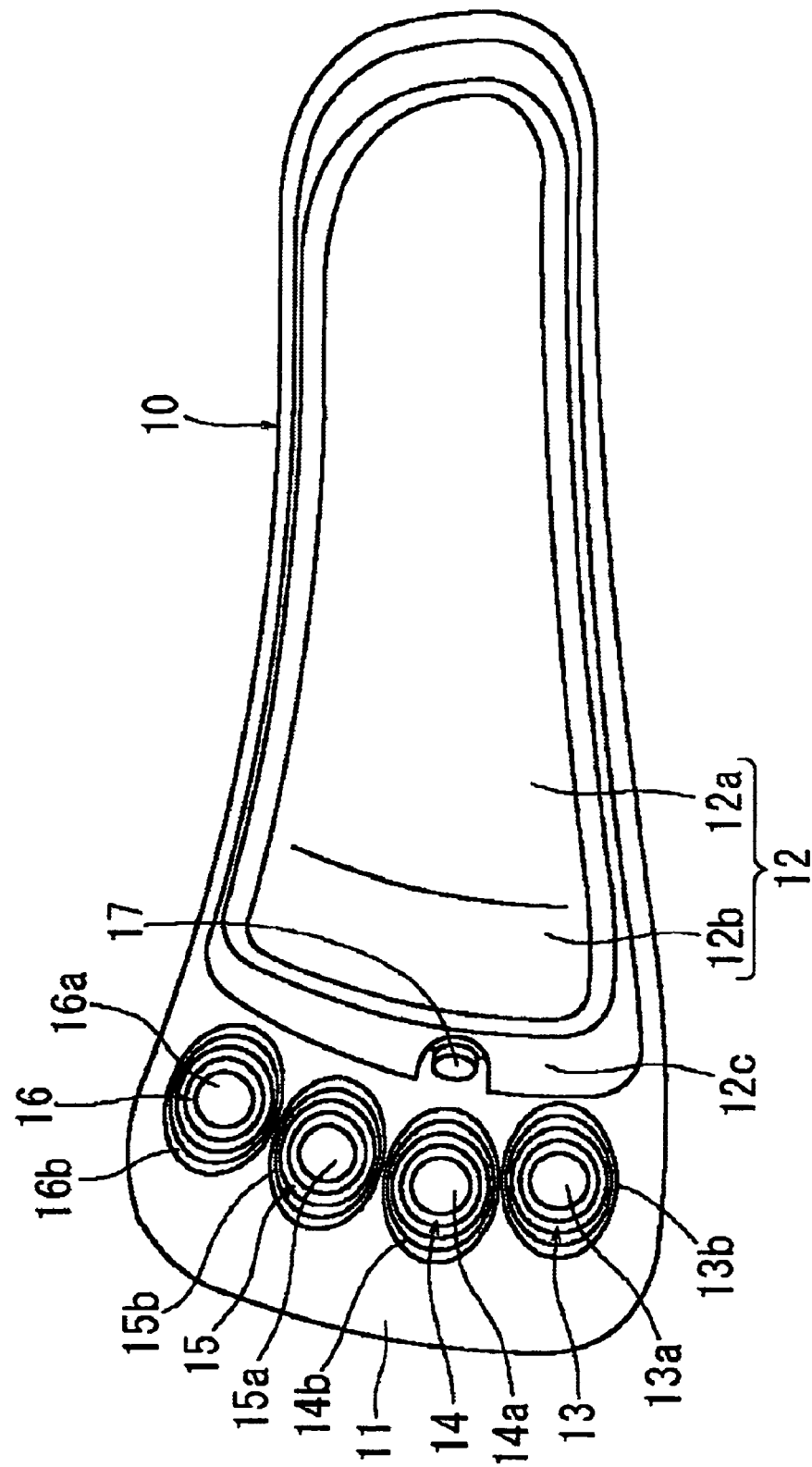
FIG. 2 is a plan view of an armrest.
Figure 3:
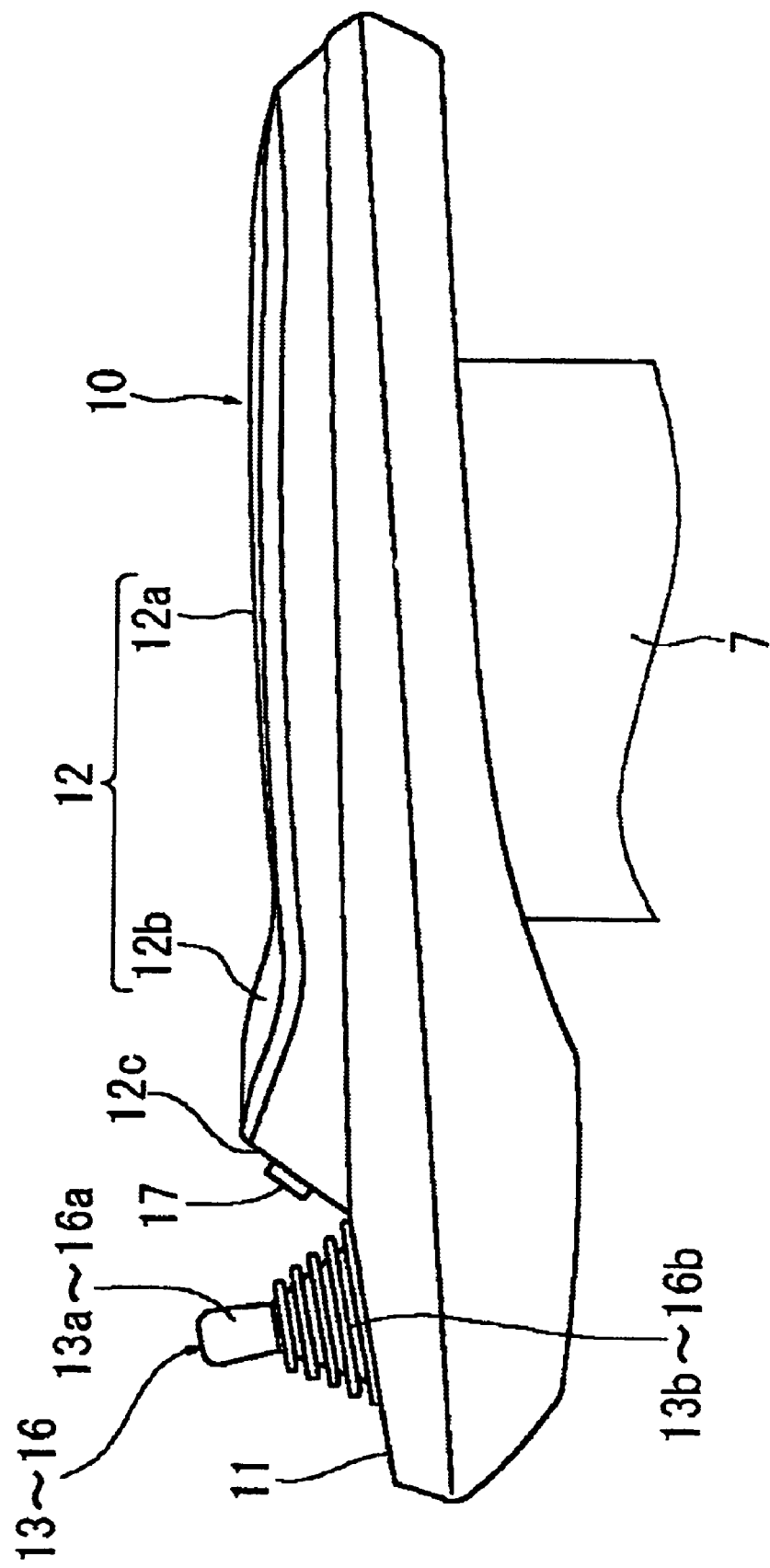
FIG. 3 is a side view of the armrest.

The preferred embodiment according to the present invention will be described by referring to FIGS. 1 through 6. The present invention is applied to a forklift truck in the preferred embodiment. In FIG. 1, an arrow indicates a longitudinal direction of a forklift truck. In FIGS. 2 and 3, the left side and the right side of the drawings respectively correspond to the front side and the rear side of the armrest along the longitudinal direction of the of the forklift truck.

As shown in FIG. 1, a hood 2 is arranged on a body 1 of the forklift truck to cover a battery or an engine (not shown). A seat 3, upon which an operator sits, and an armrest 10 for supporting the operator's arm are arranged on the hood 2. Also, a headguard 4 is arranged on the body 1 to protect the operator from falling objects. The headguard 4 is constituted of four pillars 4a that are erected on the body 1 and a guard portion that is supported by the four pillars 4a and that is not shown in the drawings.

A counter weight 8 is mounted on the rear side of the body 1. The rear end of the hood 2 is connected to the counter weight 8 through a pair of hinges 5 so as to pivot on the hinges 5 in the front-and-rear direction of the forklift truck, that is, in the longitudinal direction of the forklift truck. Thereby, the hood 2 opens and closes.

The seat 3 is fixed on the hood 2 through bolts. The armrest 10 is arranged at the right side of the seat 3 so as to be parallel to the seat 3. A bracket 7 is erected on the hood 2, and the armrest 10 is fixed to the bracket 7. An operating apparatus for loading work is arranged on the armrest 10.

Referring to FIGS. 2 and 3, the main body of the armrest 10 is made of a rigid material, such as an iron sheet and synthetic resin, in the form of a box having substantially rectangular surfaces so as to extend in the front-and-rear direction of the forklift truck. The armrest 10 includes a lever-arranged region 11, where an operating member for controlling the loading operation is arranged, and a rest region 12 on its top surface that extends in the front-and-rear direction of the forklift truck. The rest region 12 is in adjacent to the lever-arranged region 11 and formed by a pad. The top surface of the rest region 12 is higher than that of the lever-arranged region 11. The lever-arranged region 11 is located on the front side of the armrest 10 while the rest region 12 is located behind the lever-arranged region 11.

A plurality of control levers as operating members for loading operation is arranged on the lever-arranged region 11 in the lateral direction of the armrest 10 and includes, starting from the left of the lever-arranged region 11, a lift lever 13 for raising and lowering the forklift truck's mast, a tilt lever 14 for tilting the mast frontward and backward, and a pair of attachment levers 15 and 16 for controlling other attachments. Each of the control levers 13 through 16 is miniaturized such that each of the control levers 13 through 16 is capable of being operated by the operator pinching each of knobs 13a through 16a of the control levers 13 through 16 with his fingertips. The control levers 13 through 16 other than the knobs 13a through 16a are covered with bellows 13b through 16b. The lever-arranged region 11 and the rest region 12 respectively correspond to a first region and a second region in the claimed invention.

The rest region 12 is made of material having appropriate flexibility to obtain a soft feeling. The rest region 12 includes an arm pad portion 12a for supporting the operator's arm and a palm pad portion 12b for supporting the operator's palm. The top surface of the palm pad portion 12b, where a palm is put, slopes gently up from the top surface of the arm pad portion 12a frontward. The front surface 12c of the palm pad portion 12b slopes down toward the top surface of the lever-arranged region 11 from the front end of the top surface of the palm pad portion 12b. Namely, viewed from the side of the armrest 10 (see FIG. 3), the palm pad portion 12b forms an angular shape, and the front surface 12c of the palm pad portion 12b is inclined with respect to the lever-arranged region 11 in the rearward direction of the armrest 10. Meanwhile, the heights of the control levers 13 through 16 and the palm pad portion 12b and the distances between the control levers 13 through 16 and the palm pad portion 12b are determined such that the operator's fingertips reach the top surface of the knobs 13a through 16a when his palm is placed on the palm pad portion 12b and his fingertips are stretched frontward. Therefore, when the operator's arm and palm are put on the top surface of the rest region 12, the control levers 13 through 16 are capable of being operated due to the above structure.

A horizontal stop switch 17, which is a push-button switch, is arranged on the front surface 12c of the palm pad portion 12b behind the tilt lever 14 that controls the frontward and backward tilt of a mast. The horizontal stop switch 17 is a switch for automatically stopping the tilt of a mast 22 (shown in FIG. 6), when a fork 23 (shown in FIG. 6) becomes horizontal as a result of the operator's use of the tilt lever 14 that controls the tilt of the mast 22. The horizontal stop switch 17 is a push-on-push-off switch. When the horizontal stop switch 17 is pushed, the horizontal stop switch 17 stays at a pushed position which is in an ON-state. When the horizontal stop switch 17 is pushed again, ON-state is released, and the horizontal stop switch 17 automatically returns from the pushed position to an initial position, which is in OFF-state.

The operating apparatus for controlling the loading work includes the control levers 13 through 16 and the horizontal stop switch 17.

Figure 4:
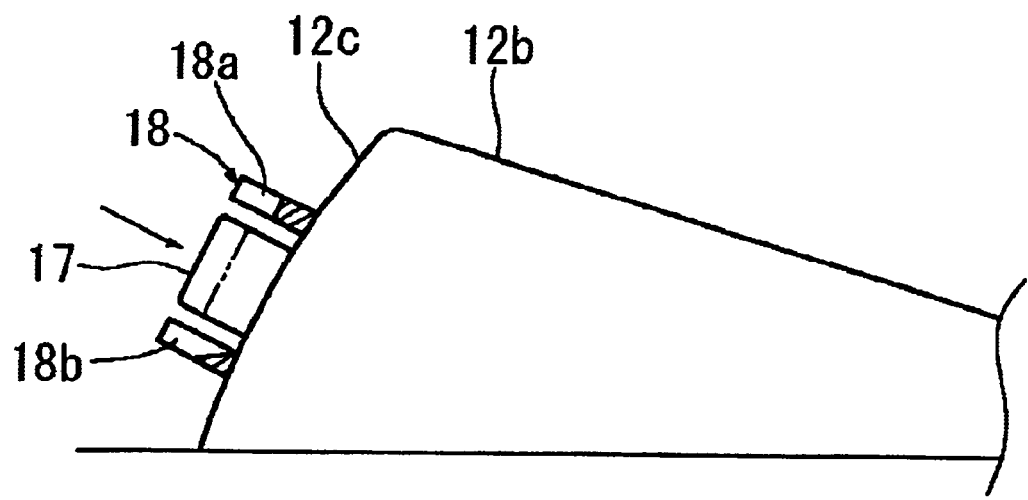
FIG. 4 is a partially enlarged cross-sectional view of the armrest around a horizontal stop switch for stopping a mast at a position where a fork becomes horizontal.

As shown in FIG. 4, the horizontal stop switch 17 is surrounded by a cylinder 18. The cylinder 18 is secured to the front surface 12c of the palm pad portion 12b. The height of the end surface of the horizontal stop switch 17, when in an OFF-state, is as high as the end surface of the cylinder 18 in the direction in which the horizontal stop switch 17 is pushed. Thereby, even when the horizontal stop switch 17 is accidentally touched by the fingertip, the horizontal stop switch 17 is avoided from being turned on. Further, a first notch 18a is formed in the upper side of the cylinder 18 in the circumferential direction of the cylinder 18 so as to extend in the axial direction of the cylinder 18 for confirming the position of the horizontal stop switch 17. A second notch 18b is formed in the lower side of the cylinder 18 in the circumferential direction of the cylinder 18 for draining water.

The cylinder 18 corresponds to a guard in the claimed invention. The first and second notches 18a and 18b respectively correspond to first and second openings in the claimed invention.

Figure 6:
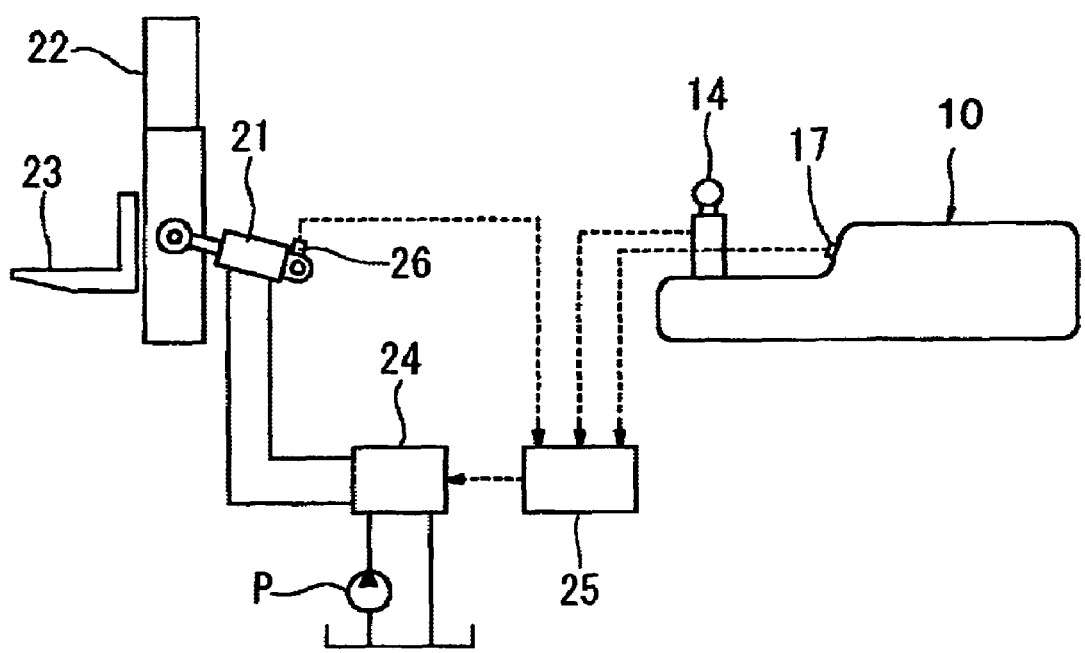
FIG. 6 is a schematic view of an operation circuit of a tilt cylinder.

FIG. 6 shows a schematic view of an operation circuit of a tilt cylinder 21. Since the operation circuit of the tilt cylinder 21 is similar to a conventional operation circuit, the operation circuit is simply described. As shown in FIG. 6, the mast 22 is connected to the tilt cylinder 21, and the fork 23 is connected to the mast 22. The mast 22 is tilted frontward and backward respectively by stretching and shortening the tilt cylinder 21. The flow direction of hydraulic fluid fed from a hydraulic pump P is controlled by a control valve 24. Thereby, the tilt cylinder 21 is stretched and shortened. Also, the control valve 24 is switched among its neutral position, its forward tilting position and its backward tilting position based on the order from a controller 25. An operating signal of tilting the tilt lever 14 frontward or backward, an on-off signal from the horizontal stop switch 17 and a signal from a sensor 26 that detects the horizontal position of the fork 23 are input into the controller 25. When the fork 23 becomes horizontal in a state when the horizontal stop switch 17 is in the ON-state and the tilt lever 14 is operated, the controller 25 outputs a signal for stopping the tilt of the mast 22 into an electromagnetic valve of the control valve 24 based on these signals. The control valve 24 is then changed to its neutral position. As a result, the tilt of the mast 22 is stopped.

The above-mentioned tilt cylinder 21 corresponds to an actuator for loading in the claimed invention. The tilt lever 14 and the horizontal stop switch 17 respectively correspond to a first operating member and a second operating member in the claimed invention. The tilt lever 14 and the horizontal stop switch 17 control the tilt cylinder 21 as an actuator for loading. The lift lever 13 and the attachment levers 15 and 16 correspond to a third operating member in the claimed invention.

In the forklift truck in the present embodiment, the control levers 13 through 16 are miniaturized and are arranged on the front side of the armrest 10 in the lateral direction of the armrest 10 such that the control levers 13 through 16 are capable of being operated by pinching with the fingertips or pushing with finger cushions. Therefore, when the operator's arm and palm are put on the rest region 12, the control levers 13 through 16 are capable of being easily operated by using an elbow or a wrist as a pivot and moving the fingers. Furthermore, since a push-on-push-off switch is used as the horizontal stop switch 17, the horizontal stop switch 17 is not necessarily continuously pushed by the operator.

In the present preferred embodiment, the horizontal stop switch 17 for controlling the tilt cylinder 21 is separated from the tilt lever 14 for controlling the tilt cylinder 21 and is arranged behind the tilt lever 14. Therefore, when the horizontal stop switch 17 is pushed, the positions of the fingertips need to be changed from the knob 14a of the tilt lever 14 to the horizontal stop switch 17. Thereby, when the tilt lever 14 is operated, a wrong actuation of the horizontal stop switch 17 is avoided. Meanwhile, since the horizontal stop switch 17 is arranged behind the tilt lever 14, it is easy to recognize that the horizontal stop switch 17 and the tilt lever 14 are related to each other.

The top surface of the palm pad portion 12b for supporting the operator's arm is higher than that of the lever-arranged region 11. The horizontal stop switch 17 is arranged on the inclined front surface 12c of the palm pad portion 12b corresponding to a step surface between the top surface of the palm pad portion 12b and the lever-arranged region 11. When the operator's arm or palm is put on the top surface of the armrest 10 (that is, on the arm pad portion 12a and the palm pad portion 12b), the front surface 12c of the palm pad portion 12b is not capable of being touched by the operator's fingers. Therefore, the wrong operation for the horizontal stop switch 17 is effectively avoided.

Furthermore, since the horizontal stop switch 17 is surrounded by the cylinder 18, the cylinder 18 is effective to avoid the wrong operation of the horizontal stop switch 17.

On the other hand, when the horizontal stop switch 17 is intentionally operated, the cylinder 18 does not interfere with the operation. Meanwhile, since the first notch 18a for confirming the position of the horizontal stop switch 17 and the second notch 18b for draining water are formed in the cylinder 18, the potential negative effects of surrounding the horizontal stop switch 17 with the cylinder 18 do not occur. Namely, water does not stay in the cylinder 18 and it is easy to confirm the position of the horizontal stop switch 17.

The present invention is not limited to the above-mentioned preferred embodiments, and following alternative embodiments may be practiced.

Figure 5:
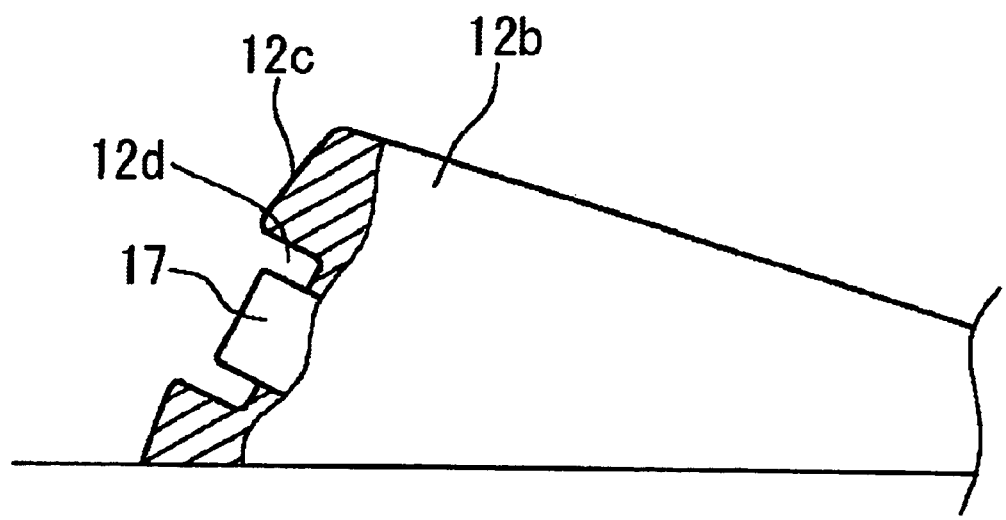
FIG. 5 is a partially cutaway side view of the armrest around the horizontal stop switch in one of the alternative embodiments.

FIG. 5 shows one of the alternative embodiments regarding the guard for a horizontal stop switch 17 to avoid the wrong operation. In the alternative embodiment, a recess may be formed in the front surface 12c of the palm pad portion 12b, and the horizontal stop switch 17 is placed in the recess. Therefore, since the pad itself has guard function, the number of parts can be reduced due to the structure.

The tilt lever 14 and the horizontal stop switch 17 control the tilt cylinder 21 to tilt the mast 22 frontward and backward in the above-mentioned present preferred embodiment. Although the present invention is applied to the tilt cylinder as a common actuator for loading in the above-mentioned present preferred embodiment, the present invention may be applied to a lift cylinder for raising and lowering a mast or an actuator for controlling other attachments as a common actuator for loading. For example, when the actuator for loading is the lift cylinder, the lift lever 13 and a lift stop switch, which stops the raising and lowering motion of the mast when the fork becomes a predetermined level, respectively correspond to the first operating member and the second operating member, and are related to each other. The lift lever 14 and the attachment levers 15 and 16 correspond to a third operating member in the claimed invention.

Although the horizontal stop switch 17 is arranged behind the tilt lever 14 in the present embodiment, the horizontal stop switch 17 may be arranged on the front surface or on the side surface of the armrest 10, or on the lever-arranged region 11 behind the tilt lever 14.

The horizontal stop switch 17 may be a switch in which light is emitted in the ON-state and in which the light is quenched in the OFF-state to more easily confirm the position of the horizontal stop switch 17. The front surface 12c of the palm pad portion 12b may be changed from an inclined surface to a substantially perpendicular surface to the top surface of the lever-arranged region 11.

Therefore, the present examples and embodiments are to be considered as illustrative and not restrictive, and the invention is not to be limited to the details given herein but may be modified within the scope of the appended claims.

What is claimed is:

1. An industrial vehicle comprising:
   an armrest extending in a front-and-rear direction of the vehicle;
   a plurality of operating members for controlling a loading operation of the vehicle arranged on the front portion of the armrest, the operating members comprising a first operating member for controlling an actuator for loading, a second operating member for controlling the actuator and a third operating member;
   a mast connected to the actuator; and
   a fork connected to the mast, wherein the first operating member is operated for tilting the mast frontward and backward, the second operating member being operated for automatically stopping the tilt of the mast at a position where the fork becomes horizontal,
   wherein the armrest has a first region and a second region adjacent to the first region, the first region having a first top surface on which the first and third operating members are arranged, the second region being formed by a pad, the second region having a second top surface and a front surface, the second top surface being higher than the first top surface, the second operating member is arranged on the front surface of the second region.

2. The industrial vehicle according to claim 1, wherein the second operating member is arranged behind the first operating member.

3. The industrial vehicle according to claim 1, further comprising a guard arranged on the front surface of the second region, the second operating member being surrounded by the guard.

4. The industrial vehicle according to claim 3, wherein the second operating member is a push-on-push-off switch.

5. The industrial vehicle according to claim 4, wherein the guard is a cylinder, a first opening for confirming a position of the switch being formed in the cylinder in a circumferential direction of the cylinder.

6. The industrial vehicle according to claim 5, wherein the first opening is a notch.

7. The industrial vehicle according to claim 4, wherein the guard is a cylinder, a second opening for draining water being formed in the cylinder in a circumferential direction of the cylinder.

8. The industrial vehicle according to claim 7, wherein the second opening is a notch.

9. The industrial vehicle according to claim 4, wherein the second operating member is a switch in which light is emitted when the switch is on and in which the light is quenched when the switch is off.

10. The industrial vehicle according to claim 1, wherein the second region includes a recess in its front surface, the second operating member being placed in the recess, so that the second operating member is guarded in the recess.

11. The industrial vehicle according to claim 1, wherein the front surface of the second region is inclined with respect to the top surface of the first region in a rearward direction of the armrest.

12. The industrial vehicle according to claim 1, wherein the first region is located on the front side of the armrest while the second region being located behind the first region.

13. The industrial vehicle according to claim 1, wherein the first region is a lever arranged region and the second region is a rest region.

14. The industrial vehicle according to claim 1, wherein the second region further includes an arm pad portion for supporting an arm of an operator of the vehicle and a palm pad portion for supporting a palm of the operator.

* * * * *